United States Patent
Saily et al.

(10) Patent No.: US 10,021,635 B2
(45) Date of Patent: Jul. 10, 2018

(54) TRANSMISSION OF INFORMATION TO A UE FOR PROMOTING THE SELECTION OF A PARTICULAR CELL

(75) Inventors: Mikko Saily, Helsinki (FI); Klaus Ingemann Pedersen, Aalborg (DK); Lars Dalsgaard, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/367,362

(22) PCT Filed: Dec. 23, 2011

(86) PCT No.: PCT/EP2011/074010
§ 371 (c)(1),
(2), (4) Date: Oct. 1, 2014

(87) PCT Pub. No.: WO2013/091732
PCT Pub. Date: Jun. 27, 2013

(65) Prior Publication Data
US 2015/0050933 A1    Feb. 19, 2015

(51) Int. Cl.
*H04W 48/20* (2009.01)
*H04W 48/08* (2009.01)
*H04W 36/00* (2009.01)
*H04W 84/04* (2009.01)

(52) U.S. Cl.
CPC .......... *H04W 48/20* (2013.01); *H04W 48/08* (2013.01); *H04W 36/0083* (2013.01); *H04W 84/045* (2013.01)

(58) Field of Classification Search
CPC .............................. H04W 48/20; H04W 48/08
USPC ................ 455/435.1, 436-439, 450, 456.1; 370/331, 332
See application file for complete search history.

(56) References Cited

U.S. PATENT DOCUMENTS

| | | | |
|---|---|---|---|
| 6,285,884 B1 | 9/2001 | Vaara | 455/441 |
| 8,391,158 B2* | 3/2013 | Gupta | H04J 11/0093 370/241 |
| 8,660,570 B2* | 2/2014 | Han | H04W 24/02 455/450 |
| 8,731,559 B2* | 5/2014 | Shi | H04W 36/0055 370/331 |
| 8,855,007 B2* | 10/2014 | Gupta | H04W 8/26 370/254 |
| 9,066,262 B2* | 6/2015 | Siomina | H04W 24/10 |
| 9,143,999 B2* | 9/2015 | Nylander | H04W 36/0061 |
| 9,237,473 B2* | 1/2016 | Kazmi | H04W 24/10 |

(Continued)

FOREIGN PATENT DOCUMENTS

| | | |
|---|---|---|
| CN | 101448239 A | 6/2009 |
| CN | 101478744 A | 7/2009 |

(Continued)

*Primary Examiner* — Cong Tran
(74) *Attorney, Agent, or Firm* — Harrington & Smith (57) ABSTRACT

Methods and apparatus for mobility control are disclosed. A network entity can generate information promoting at least one cell for selection by at least one mobile device and associate the information with at least one physical cell identity available for selection. The information is then communicated to the at least one mobile device. The at least one mobile device can then take the information into account in cell selection.

20 Claims, 3 Drawing Sheets

(56) References Cited

U.S. PATENT DOCUMENTS

| | | | |
|---|---|---|---|
| 2008/0188215 A1* | 8/2008 | Bergstrom | H04W 48/20 455/424 |
| 2009/0129291 A1* | 5/2009 | Gupta | H04W 8/26 370/254 |
| 2009/0291686 A1* | 11/2009 | Alpert | H04W 36/0083 455/436 |
| 2010/0124179 A1 | 5/2010 | Lee et al. | 370/252 |
| 2010/0136969 A1* | 6/2010 | Nader | H04W 48/18 455/434 |
| 2010/0273485 A1 | 10/2010 | Huang et al. | 455/435.3 |
| 2011/0098052 A1* | 4/2011 | Jung | H04W 72/005 455/450 |
| 2011/0201332 A1* | 8/2011 | Siomina | H04W 64/00 455/434 |
| 2011/0256868 A1* | 10/2011 | Nogami | H04J 11/0069 455/435.1 |
| 2011/0281583 A1* | 11/2011 | Hole | H04W 36/0055 455/436 |
| 2011/0319083 A1* | 12/2011 | Lee | H04W 36/00 455/436 |
| 2011/0319086 A1* | 12/2011 | Katori | H04W 48/08 455/440 |
| 2012/0190363 A1* | 7/2012 | Maeda | H04W 48/02 455/435.1 |
| 2013/0013797 A1* | 1/2013 | Henttonen | H04W 4/00 709/229 |
| 2013/0182583 A1* | 7/2013 | Siomina | H04W 24/10 370/252 |
| 2013/0190012 A1* | 7/2013 | Suzuki | H04W 36/04 455/456.1 |
| 2013/0295926 A1* | 11/2013 | Michel | H04W 36/0061 455/434 |

FOREIGN PATENT DOCUMENTS

| | | |
|---|---|---|
| CN | 101500218 A | 8/2009 |
| EP | 2034750 A1 | 3/2009 |
| EP | 2 120 369 A1 | 11/2009 |
| WO | WO 2011/143673 A1 | 11/2011 |

* cited by examiner

TRANSMISSION OF INFORMATION TO A UE FOR PROMOTING THE SELECTION OF A PARTICULAR CELL

The application relates to mobile communications and more particularly to cell selection/reselection by a mobile device, in particular in heterogeneous communication systems. A communication system can be seen as a facility that enables communication sessions between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate with the access points, how various aspects of the communications shall be implemented and how the devices shall be configured.

Signals can be carried on wired or wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobile communications for users where a mobile device can communicate over an air interface with another communication device such as e.g. a base station and/or other user equipment.

An example are cellular communication systems that are based on architecture standardized by the 3rd Generation Partnership Project (3GPP). A recent development of this is often referred to as the long-term evolution (LTE) of the Universal Mobile Telecommunications System (UMTS) radio-access technology. In LTE base stations are commonly referred to as enhanced NodeBs (eNB). In LTE a node providing a relatively wide coverage area is referred to as a macro eNode B. Network nodes can also provide smaller service areas. Examples of such smaller or local radio service area network nodes include femto nodes such as Home eNBs (HeNB), pico nodes such as pico eNodeBs (pico-eNB), micro nodes and remote radio heads. A smaller radio service area can be located wholly or partially within one or more larger radio service areas. Such multi-layered systems are often referred to as heterogeneous networks. An example of a multi-layered system is a mixture of macro base stations and small power base stations (e.g. pico and micro stations). The various layers can be deployed as part of a cellular network. It is noted that a multi-layer LTE network is used herein only as an example of multi-layered systems and that other solutions are also possible.

Mobility can be provided in the multi-layer or heterogeneous cellular systems between the different layers. Therefore it may need to be decided if a cell from the same or another layer is to be selected for use by a mobile device. Mobility Management (MM) can impact user experience, mobile power consumption and load reduction of network signaling, in particular in connection with heterogeneous networks.

A parameter known as the Physical Cell Identity (PCI) is used to identify a cell for radio functions, for example, measurement and cell selection/reselection procedures. PCI of a cell does not need to be a unique network-wide cell identifier. However, PCI should be unique on a local scale to avoid collision and/or confusion with neighboring cells.

It is noted that although for example in 3GPP cell selection and reselection are separated into somewhat different processes both of these terms in general can be understood to refer to a process where a cell is selected. Thus, although in the specific terminology of the 3GPP cell selection is used in the context where cell selection is required on transition from mobility management detached state to registered state, or recovery from out of coverage and a UE first performs a cell selection and then later on a cell reselection, in general both of these procedures involve a procedure where a cell is selected. Therefore, although in this description both terms selection and reselection are used these both shall be understood generally mean an operation where a cell is selected by a mobile device.

It has been recognized that mobility problems for fast moving users can be associated with out-bound handovers from small power cell, e.g. handout from pico cell to another pico or macro layer. This problem may arise, for example, when small power cells are deployed next to main roads, rural roads and highways. In this case it is often considered best to keep fast moving mobile devices at the macro layer due to problems in mobility performance. However, this may cause coverage holes.

When a mobile device is in radio resource control (RRC) connected mode, a network controls the mobility procedure based on measurements by the mobile device. Usually the handover target cell is the best ranked cell in terms of power and/or quality that are determined based on measurements by the mobile device. A problem in here may occur if mobile device specific measurement configuration is not optimized for current mobility state of the device in heterogeneous environment deploying both macro and small power base stations. In such case the network may fail to handover the mobile device to the most suitable cell for its current mobility state profile.

In RRC idle mode, the mobile device is responsible of the mobility procedure. Idle mode mobility is based on cell ranking, where the mobile device measures the neighboring non-black listed cells and camps in the best available cell. This strategy, however, may not in all occasions result an appropriate cell for all mobile devices, for example those moving fast, for example faster than 30 km/h. For example, when an idle mobile device is paged, or an idle mobile device is trying to make a connection, it should be preferably in the best and the most suitable cell where handover can be avoided as a first step when the connection starts. Also, the probability of Radio Link Failures (RLF) may also be minimized if a best suitable cell could be selected from the outset.

RRC in one eNB can adjust the mobility parameters but cannot necessarily resolve problems that relate to non-suitable neighbors. A typical example is a radio link failure which can occur shortly after a mobile device has connected to a target cell. Also setting the cell selection/reselection parameters in idle mode may be difficult since the target cell is not necessarily known due to non-predictable trajectories of the mobile device. Even if the reselection is successful and RLF can be avoided, an unsuitable target cell may result handover immediately after initial RRC connection establishment.

It is noted that the above discussed issues are not limited to any particular communication environment and station apparatus but may occur in any appropriate system where cells are selected by mobile devices.

Embodiments of the invention aim to address one or several of the above issues.

In accordance with an embodiment there is provided a method for mobility control by a network entity, comprising generating information promoting at least one cell for selection by at least one mobile device, associating the information with at least one physical cell identity available for selection, and sending the information to the at least one mobile device for use in cell selection.

In accordance with another embodiment there is provided a method for mobility control by a mobile device, comprising receiving information promoting at least one cell for selection, the information being associated with at least one physical cell identity available for selection by the mobile device, and taking the information into account in cell selection.

In accordance with another embodiment there is provided an apparatus for mobility control, the apparatus comprising at least one processor, and at least one memory including computer program code, wherein the at least one memory and the computer program code are configured, with the at least one processor, to generate information promoting at least one cell for selection by at least one mobile device, associate the information with at least one physical cell identity available for selection, and cause sending of the information to the at least one mobile device for use in cell selection.

In accordance with a yet another embodiment there is provided an apparatus for mobility control, the apparatus comprising at least one processor, and at least one memory including computer program code, wherein the at least one memory and the computer program code are configured, with the at least one processor, to process information received from network and promoting at least one cell for selection, the information being associated with at least one physical cell identity available for selection by the mobile device, and take the information into account in cell selection.

In accordance with a more specific aspect the information can be provided in or in association with a list of physical cell identities.

The information promoting at least one cell can be generated independently from real and/or physical characteristics of the promoted cell. The information may promote the at least one cell on the grounds of its determined effect on mobility. The information may prioritise the promoted at least one cell. The prioritization of the promoted at least one cell may be based on determined effect of the at least one cell on coverage. The information promoting at least one cell may be generated taking into account at least one characteristic of the at least one mobile device. The information may comprise the type of at least one target cell. A small area cell may be promoted over a large area cell. The at least one mobile device may be in idle or connected mode.

A computer program comprising program code means adapted to perform the herein described methods may also be provided. In accordance with further embodiments apparatus and/or computer program product that can be embodied on a computer readable medium for providing at least one of the above methods is provided.

A node such as a base station or a mobile device can be configured to operate in accordance with the various embodiments.

It should be appreciated that any feature of any aspect may be combined with any other feature of any other aspect. Embodiments will now be described in further detail, by way of example only, with reference to the following examples and accompanying drawings, in which:

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A non-limiting example of the recent developments in communication system architectures is the long-term evolution (LTE) of the Universal Mobile Telecommunications System (UMTS) standardized by the 3rd Generation Partnership Project (3GPP). More recent development of the LTE are sometimes referred to as LTE-Advanced. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
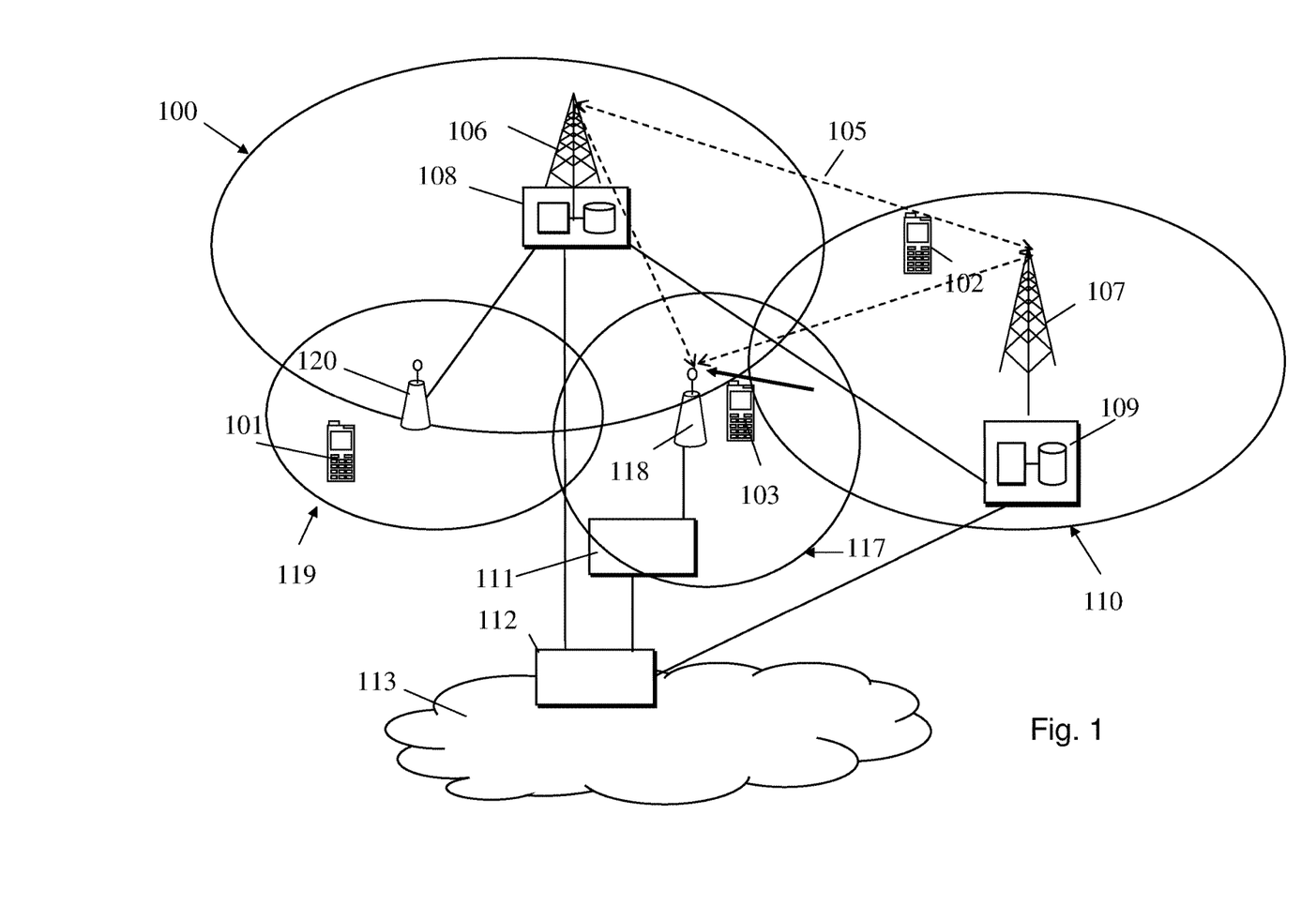
FIG. 1 shows a schematic diagram of a network according to some embodiments.

A mobile communication device 101, 102, 103 can be provided wireless access via base stations or similar wireless transmitter and/or receiver nodes providing radio service areas or cells. In FIG. 1 four different neighbouring radio service areas are cells 100, 110, 117 and 119 are shown being provided by base stations 106, 107, 118 and 120. It is noted that the number of cells and the cell borders are only schematically shown for illustration purposes in FIG. 1, and that these can vary considerably from that shown. It shall be understood that the sizes and shapes of the cells may vary considerably from those shown in FIG. 1.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus.

Different types of possible cells include those known as macro cells, pico cells, micro cells and femto cells. For example, in LTE-Advanced the transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH) that are connected to for example an eNB. A mobile communication device may be located in the service area of different cell, communicate with more than one cell and be handed over from a cell to another.

In particular, FIG. 1 depicts two macro cells 100 and 110 provided by wide area base stations 106 and 107. A smaller cell 117 in this example can be a pico-cell or a femto cell.

A yet further cell 119 is shown to be provided by a remote radio head (RRH) 120 connected to the base station apparatus of cell 100. Base station nodes may communicate via each other via fixed line connection and/or air interface. The logical connection between the base station nodes can be provided for example by an X2 interface. In FIG. 1 this interface is shown by the dashed line denoted by 105. However, other interfaces such as S1 interface are also possible for exchange of information within the network.

In FIG. 1 the macro base stations are shown as connected to a wider communications network 113 via gateway 112. A further gateway function may be provided to connect to another network. The smaller stations 118 and 120 can also be connected to the network 113, for example by a separate gateway function and/or via the macro level cells. In the example, station 118 is connected via a gateway 111 whilst station 120 connects via the controller apparatus 108.

Figure 2:
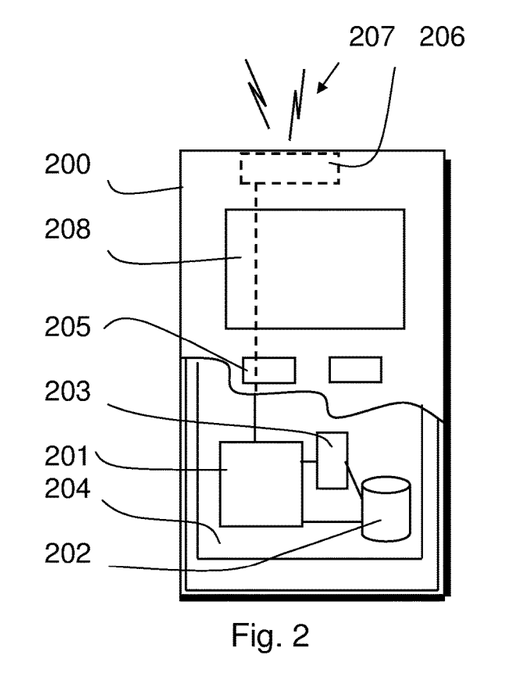
FIG. 2 shows a schematic diagram of a mobile communication device according to some embodiments.

A possible mobile communication device for communications with the base stations will now be described in more detail with reference to FIG. 2 showing a schematic, partially sectioned view of a mobile device 200. Such a device is often referred to as user equipment (UE) or terminal. An appropriate mobile device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile device may provide, for example, communication of data for carrying communications such as voice, electronic mail (email), text message, multimedia and so on. Users may thus be offered and provided numerous services via their devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device may receive and transmit signals over an air interface 207 with multiple base station via an appropriate transceiver apparatus. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
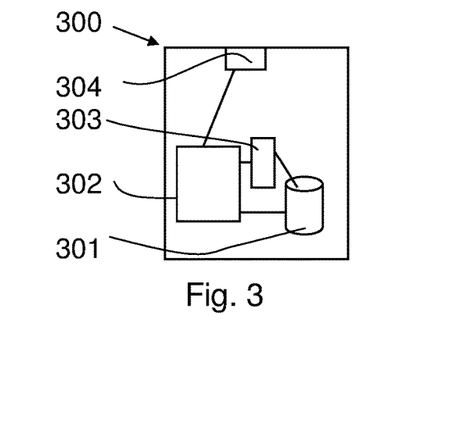
FIG. 3 shows a schematic diagram of a control apparatus according to some embodiments.

FIG. 3 shows an example of a control apparatus for a communication system, for example to be coupled to and/or for controlling a transceiver base station. The control apparatus 300 can be arranged to provide control on communications in the service area of a cell. In some embodiments a base station can comprise a separate control apparatus. In other embodiments the control apparatus can be another network element. The control apparatus 300 can be configured to provide control functions in association with generation and communication of information of cells associated with cell lists and/or control functions based on such information by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station. The control apparatus can be configured to execute an appropriate software code to provide the control functions.

A wireless communication device, such as a mobile or base station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antennae elements.

In FIG. 1 mobile device 103 is shown to be moving from cell 110 towards cell 100, see the arrow. However, for a mobile device moving from cell 110 to cell 100 the coverage between the two macro layer cells may not be optimal, for example due to size, shape and/or interference. For example, there can be a coverage hole between the macro level cells 110 and 100, or at least an area of relatively bad radio conditions. In accordance with an embodiment improved coverage for a fast moving mobile device can be provided by forcing the mobile device 103 to select the smaller cell 117 instead of the macro layer cell 100, as will be explained in more detail below.

Figure 4:
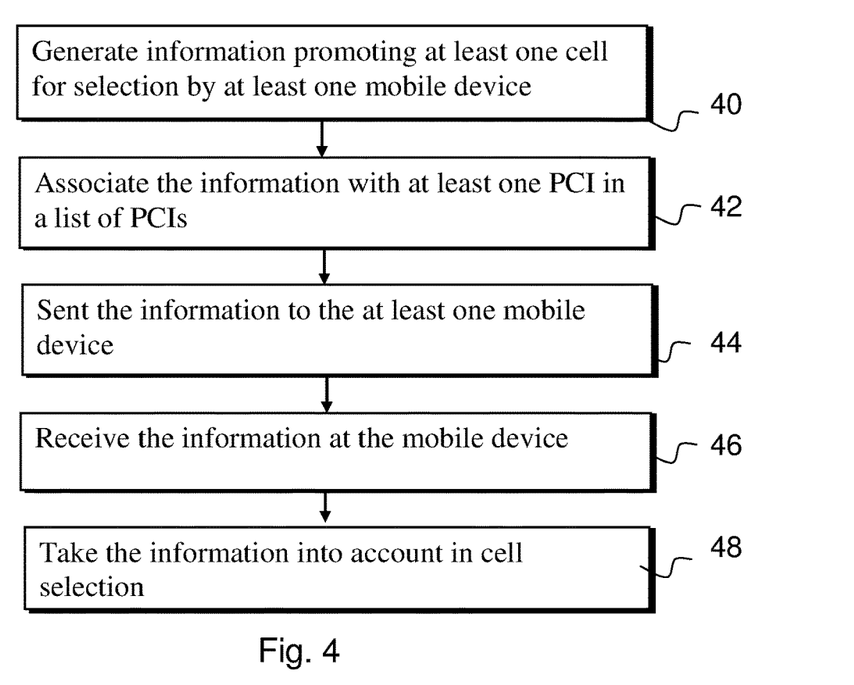
FIG. 4 shows a flowchart according to an embodiment.

In accordance with an embodiment shown by the flowchart of FIG. 4 information promoting at least one cell for selection by at least one mobile device is generated at step 40. The generation may take various factors into consideration to determine the suitability of neighbouring cells. For example, the effect on coverage and/or radio conditions in view of a particular cell can be determined, should the particular cell be selected by a mobile device instead of a cell it would otherwise select. Characteristics of the mobile device, such as speed, direction and/or mobility history thereof may also be taken into consideration when determining the information promoting a cell or cells.

The information is then associated at 42 with at least one physical cell identity available for selection. The information is then sent at 44 to the at least one mobile device for use in network assisted cell reselection.

FIG. 4 shows further the operation at the mobile device where the information promoting at least one cell for selection is received at 46. For example, the mobile device can receive a broadcasted list of recommended cells in the form of a list of PCIs. The mobile device can then take the information associated with at least one physical cell identity in the list of physical cell identities into account in cell selection at 48.

Figure 5A:
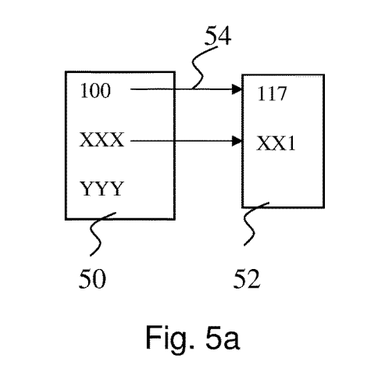
FIGS. 5*a*-5*c* shows schematic examples of cell identity lists.
Figure 5B:
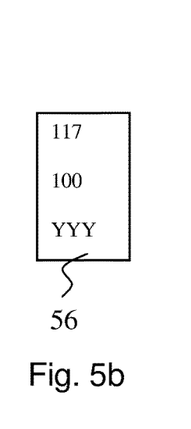
Figure 5C:
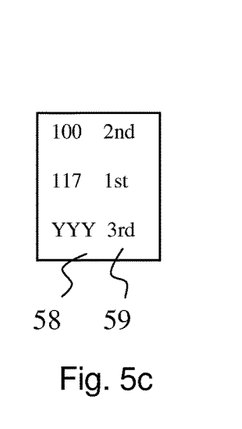

FIGS. 5a, 5b and 5c are schematic examples of possible associations. FIG. 5a shows a list 50 of physical cell identities and an associated list 52 of promoted cells. As shown, an association 54 is provided between cell 100 on the PCI list and cell 117 on the promotion list. Other cells on the PCI list may have different associations with cells on the list of promoted cells. Some cells on the PCI list may have no associations.

FIG. 5b shows another example where the information of suitability of a cell is provided by means of setting the cells in priority order in a list 56 of physical cell identities. In this example cell 117 of FIG. 1 is recommend as being the most suitable for the mobile device 103. FIG. 5c shows a yet further example where a priority order indication 59 is provided in a list 58 of cell identities. By means of associating information promoting cells with the physical cell identities (PCI) an operation can be enabled where existing PCI functionalities are not compromised. For example, PCI planning and allocation can remain unchanged. By means of the PCI association any cell can be promoted for mobility reasons, for example by classifying a cell as a priority cell. This can be used e.g. to promote individual cells for fast moving mobile devices. The promotion can be independent from the real and/or physical characteristics of the promoted cell. The network can thus force a mobile device to use small cells for the purposes of improving coverage instead of, or in addition to, capacity reasons.

For example, a cell that is smaller than a macro cell can fill a coverage hole between two macro cells. A smaller cell can be promoted for the mobility purposes simply by classifying it as "large" cell in the associated information, whereby it can be ensured that it is not be avoided by a fast moving mobile device that would not otherwise consider small cells.

As mentioned above, the recommendation may be conveyed by means of prioritization. For example, cells on a list of recommended cells that is based on associated PCIs for a mobile device to measure may be prioritized. The prioritization may be based on coverage association to a certain PCIs. According to a possibility the priority order is encoded in the order of the broadcasted cell list such that macro cells come first. Thus, instead of having associations between cells on a PCI list and recommended cell(s), a priority can be associated one or more of cells on a PCI list. The associated priority information thus indicates suitable cell or cells for a fast moving mobile device, or other type of a mobile device where special considerations may be desired. Prioritization can be used for example to avoid definitions regarding the cell size and/or type for fast moving mobile devices.

Sending of the network generated information promoting selected cell or cells is applicable to mobile devices in idle mode and/or in connected mode. In idle mode complexity of mobility procedure and power consumption may be reduced in heterogeneous systems since it is possible to direct the mobile device to perform and report measurements of neighbouring cell that are determined as sensible. For example, mandating a mobile device to read target cell system information blocks of every neighbouring cell to identify the cell type can be avoided by providing this information for selected cells in association with a PCI list.

Figure 6:
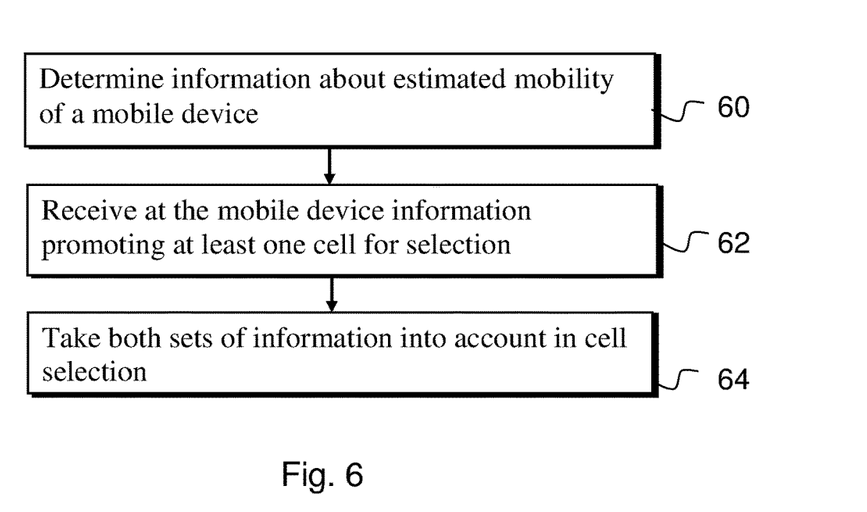
FIG. 6 shows a flowchart according to a further embodiment.

In accordance with an embodiment a mobile device in idle mode can perform the configured measurements and cell reselection based on the rank and target cell type characteristics for the current mobility state so that larger cell types shall be preferred for "high" and "medium" mobility states. An example of this is shown in FIG. 6 showing how estimated information about the mobility state provided at 60 can be used together with information received at 62 e.g. in a form of a list of recommended cell IDs in cell selection. Thus, when a mobile device has read system information (SI) and received cell type information, the mobile device can use this information at 64 together with information about the mobility state estimation (MSE). The combination of information can be used to alter (e.g. scale/rank) the selection procedure such that certain type of cells, e.g. larger cells are preferred for faster moving mobile.

In connected mode the network typically makes the final handover decision. The mobile device can scale its mobility parameters according to mobility state and target cell type characteristics, and perform instructed measurements. A benefit of this is that for example a fast moving device does not need to report cells which are not suitable, e.g. cells classified as small power cells or otherwise unsuitable cells.

A serving cell can periodically sent a list promoting neighbouring cells. For example, a cell can communicate a list of cells with cell type characteristics to a particular mobile device with each handoff, or a source cell can broadcast the information to all mobile devices in system information blocks (SIB). After receiving this list, a mobile device can periodically perform the appropriate measurements accordingly. In connected mode a specific measurement configuration may be provided in association with the PCIs, indicating the cells the mobile device should measure.

A cell can collect information about neighbour cells using X2 or S1 interface.

The embodiments can be implemented without Mobility State Estimation and related mobility parameter scaling. For example, in connected mode, S1/X2 signalling can be used at the network to identify fast moving mobile devices e.g. based on history information elements and then apply the mobile device specific measurement configurations.

A mobile device does not necessarily know the type of a cell it could measure, e.g. if a target cell to be measured is a macro cell or another type of a cell. Also, considering the large number of small sized cell (e.g. pico and femto cells) within coverage of a macro cell, a cell list may became of substantial size if information for all of the (smaller) cells is to be included. Furthermore, information of the cell identities shared within the network may not be sufficient to distinguish e.g. target femto cell type from macro cells, not to mention all cell types. To address this a "large cell" type indication can be associated to macro cells and/or to any other cell that is considered suitable. By means of this information promoting the "large" cells for selection the number of cells to be reported can be controlled.

In accordance with an embodiment mobility robustness in relation to measurement configuration and cell reselection can be improved by signalling to mobile devices a list of neighbouring Physical Cell IDs (PCI) and associated cell type characteristics. A mobile device can use this information in auto-configuring measurements, measuring, reporting and reselecting suitable cells while considering its estimated mobility state together with target cell type characteristics.

Cell type characteristics can be defined for example as a cell type (e.g. macro, micro, pico, or femto cell), cell size (e.g. an enumerated value such as large, medium, small, very small, etc, or as a numerical absolute value e.g. 1800 m, 200 m, . . . ), cell weight (e.g. numerical relative value such as 1.0, 0.5, 0.25, . . . ).

In accordance with an example a mobile device can take into account broadcasted or otherwise signalled target cell type characteristics in mobility state estimation as follows:

If a mobile device is classified to high mobility state and a target cell to be measured is characterized as "large", e.g. a macro layer cell, then the mobile device shall apply speed state scale factors for high mobility state. That is, down-scaling the mobility parameters to make measurement to trigger faster shall not be applied for target cell types medium, small, and very small.

If the mobile device is classified to medium mobility state and the target cell to be measured is characterized as "large" or "medium", e.g. deployment with medium size cells (e.g. a micro cell), then the mobile device shall apply the speed state scale factors for high mobility state. That is, down-scaling the mobility parameters to make measurement to trigger faster shall not be applied for target cell types small and very small. In these cases the mobility parameters may be up-scaled, if deemed necessary, to ensure longer mobility reaction time.

Otherwise, the mobile device can be determined as being in normal mobility state. in accordance with normal operation usual It is noted that although a cell type/size is one appropriate way to classify cells and their associations with cells on the physical cell lists, other ways are also possible. For example, a cell and its association may be defined with more flexible terms, e.g. to denote a virtual cell consisting of radio resources provided by a number of neighbouring cells as a part of their operations.

In accordance with an embodiment, prior to measuring the neighbouring target cells, a mobile device adjusts its mobility related measurement parameters based on the combination of estimated mobility state and target cell type characteristics. According to a non-limiting example based on LTE Release 8, the parameters to be adjusted can be parameters used to control measurement report triggering and cell reselection, for example Q_hyst and T_reselection parameters for RCC idle mode and Time To Trigger (TTT) parameter for RCC connected mode.

When an idle mobile device is camping on a cell, the mobile device can read system information blocks (SIB) which contain information that is associated with the PCI list. Thus also an idle device can be provided with information promoting use of a particular cell. The mobile device can receive a neighbour cell relation list of physical cell IDs along with the associated information promoting one or more cells. For example, a list of recommended cells including an indication of cell type characteristics, where cell types are representing the neighbouring macro cells and small power cells, can be provided in association with the PCI list.

Automatic neighbour cell relation list procedure or a similar mechanism providing a list of associated cells in an eNodeB may be employed. It can also be assumed that even if a mobile device is mandated to measure intra-frequency neighbouring cells without such a list, this list can be used to provide network assisted cell reselection. A PCI of a candidate target cell is already known in a serving cell.

In order to identify the best serving cell in idle mode or to aid the handover procedure when a mobile device is in connected mode, the device may be continuously making measurements of the received signal strength of the pilot channels of the neighbouring cells. In connected mode the measurements are reported to back to a serving cell using given measurement configuration. If the associated list results a situation where more than the allowed number of neighbouring cells would need to be measured, this can be overcome for example by reporting only the measurements corresponding to the neighbouring cells with the largest received signal strength or based on another cut off criteria.

In accordance with an embodiment the promotion of recommended cells is combined with information of one or more cells that should normally be avoided. These may be cells which otherwise are prioritized below large macro cells and other desirable cells, but could be used in certain predefined occasions. This may be useful e.g. if coverage holes occur due to intra-frequency interfering power from other cells. In accordance with an embodiment the information associated with a cell of the PCI list makes selection of a cell less preferable. Thus, for example instead of promoting a coverage cell for a fast moving mobile device a number of small power cells could be demoted for the fast moving mobile device, e.g. a whole pico cluster from an area might be made less desirable for selection by the association. Because of the associated information it would become more likely that e.g. a more suitable macro or femto layer cell is selected by the mobile device.

It is noted that whilst embodiments have been described in relation to LTE, similar principles can be applied to any other communication system or indeed to further developments with LTE. Thus, instead of LTE, the invention may be applied to other cellular standards as well. Macro-layer and pico/micro layers may be implemented in different radio access technology (RAT), for example such that a GSM macro layer and LTE micro layer is provided. Also, instead of carriers provided by base stations at least one of the carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
   generating, by a network node, information promoting a prioritized list of cells for selection by at least one mobile device, the information including cell type characteristics;
   associating, by the network node, the information with a list of physical cell identities available for selection; and
   sending, by the network node, the information and the associated physical cell identities available for selection to the at least one mobile device for use in cell selection, wherein said sent information includes further information for adjusting time for an event to trigger a measurement report related to the mobility of the at least one mobile device.

2. The method according to claim 1, wherein the information further includes adjustment information for one or more mobility related measurement parameters.

3. The method according to claim 1, wherein the information promoting the prioritized list of cells is generated independently from real and/or physical characteristics of the cells.

4. The method according to claim 1, wherein the information promotes the prioritized list of cells on grounds of a determined effect of the cells on mobility.

5. The method according to claim 1, wherein the information promoting the prioritized list of cells is generated taking into account at least one characteristic of the at least one mobile device.

6. The method according to claim 5, wherein the at least one characteristic is the speed and/or direction and/or mobility history of the at least one mobile device.

7. A computer program product on comprising a non-transitory computer-readable storage medium bearing computer program code embodied therein for use with a computer, the computer program code comprising code for performing the method as set forth in claim 1.

8. A method comprising:
   receiving, from a network node, information promoting a prioritized list of cells for selection, the information including cell type characteristics;
   receiving, from the network node, physical cell identities available for selection by a mobile device, the information being associated with the list of physical cell identities available for selection by the mobile device; and
   taking the information into account in cell selection by the mobile device, wherein the taking the received information into account in cell selection includes adjusting time for an event to trigger a measurement report related to the mobility of the at least one mobile device.

9. The method according to claim 8, wherein the taking the information into account in cell selection further includes adjusting of one or more mobility related measurement parameters.

10. The method according to claim 9, wherein the one or more mobility related measurement parameters include a time for an event to trigger a measurement report.

11. The method according to claim 8, wherein the information promoting the prioritized list of cells is generated independently from real and/or physical characteristics of the cells.

12. The method according to claim 8, wherein the information promotes the prioritized list of cells on grounds of a determined effect of the cells on mobility.

13. The method according to claim 8, wherein the information promoting the prioritized list of cells is generated taking into account at least one characteristic of the at least one mobile device.

14. The method according to claim 13, wherein the at least one characteristic is the speed and/or direction and/or mobility history of the at least one mobile device.

15. A computer program product comprising a non-transitory computer-readable storage medium bearing computer program code embodied therein for use with a computer, the computer program code comprising code for performing the method as set forth in claim 8.

16. An apparatus comprising:
   at least one processor; and
   at least one memory including computer program code, the at least one memory and the computer program code being configured, with the at least one processor, to:
   generate information promoting a prioritized list of cells for selection by at least one mobile device, the information including cell type characteristics;
   associate the information with a list of physical cell identities available for selection; and send the information and the associated physical cell identities available for selection to the at least one mobile device for use in cell selection, wherein said information includes further information for adjusting time for an event to trigger a measurement report related to the mobility of the at least one mobile device.

17. The apparatus according to claim 16, wherein the information further includes adjustment information for one or more mobility related measurement parameters.

18. An apparatus comprising:

at least one processor; and at least one memory including computer program code, the at least one memory and the computer program code being configured, with the at least one processor, to:

receive information from a network node promoting a prioritized list of cells for selection;

receive from the network node physical cell identities available for selection by the mobile device, the information being associated with the list of physical cell identities available for selection by the mobile device; and take the information into account in cell selection by the mobile device, wherein the taking the received information into account in cell selection includes adjusting time for an event to trigger a measurement report related to the mobility of the at least one mobile device.

19. The apparatus according to claim 18, wherein the taking the information into account in cell selection further includes adjusting of one or more mobility related measurement parameters.

20. The apparatus according to claim 19, wherein the one or more mobility related measurement parameters include a time for an event to trigger a measurement report.

* * * * *